April 3, 1962 H. MAXEN 3,027,593
CATTLE KNOCKING HAMMER
Filed Jan. 21, 1960 2 Sheets-Sheet 1
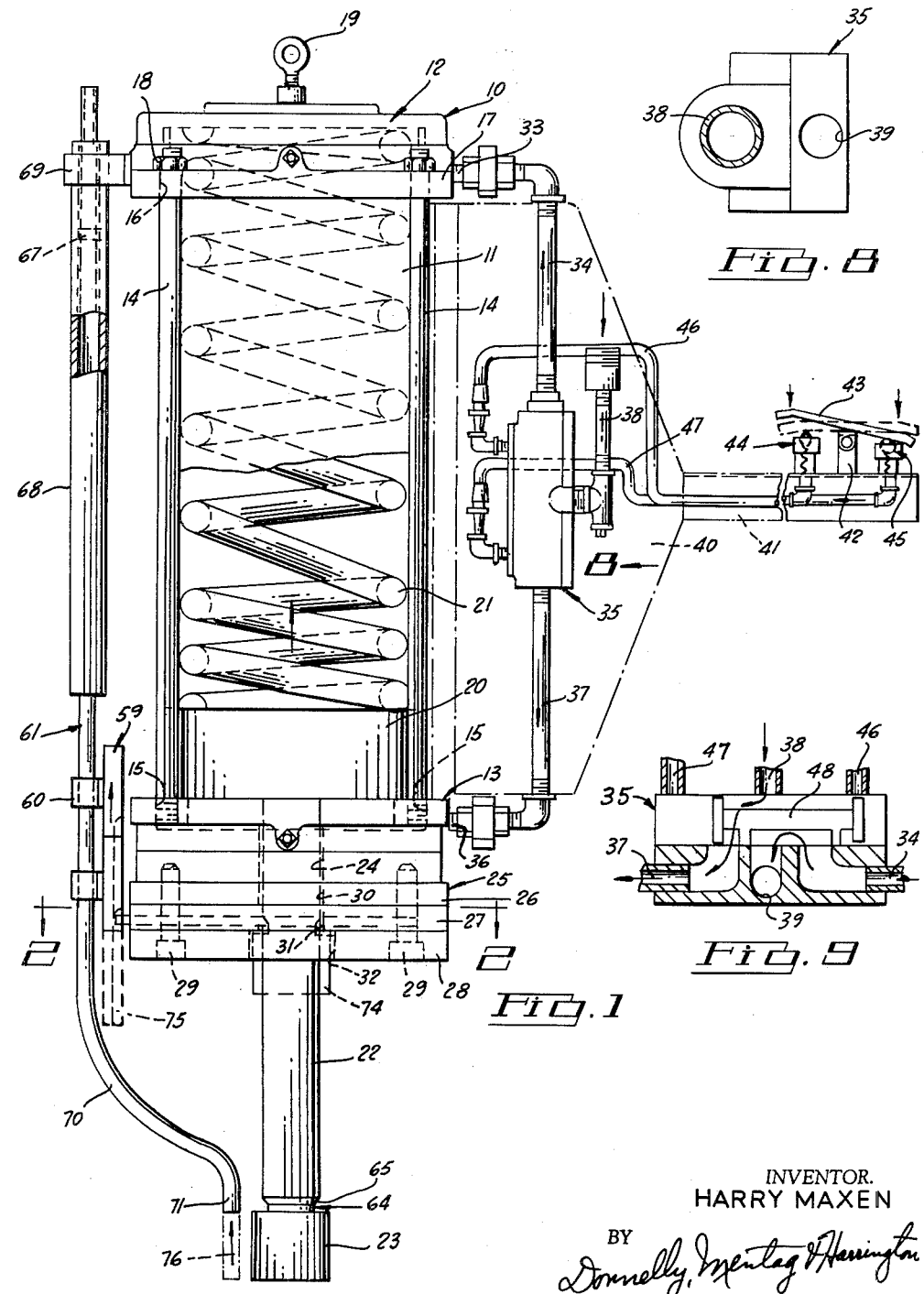
INVENTOR.
HARRY MAXEN
BY
ATTORNEYS April 3, 1962    H. MAXEN    3,027,593
CATTLE KNOCKING HAMMER
Filed Jan. 21, 1960    2 Sheets-Sheet 2
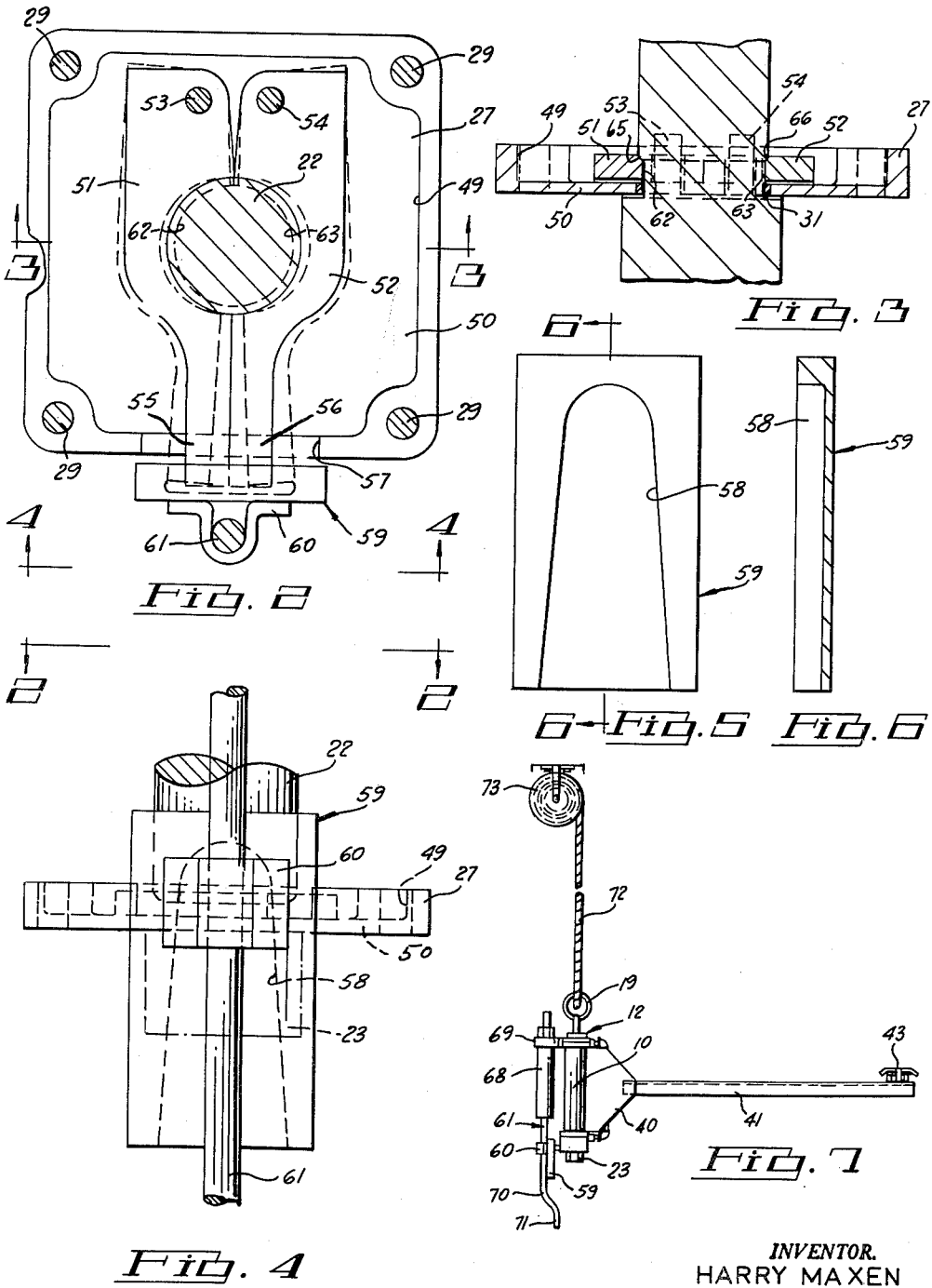
INVENTOR.
HARRY MAXEN
BY
Donnelly, Mentag & Harrington
ATTORNEYS

United States Patent Office 3,027,593
Patented Apr. 3, 1962

3,027,593
CATTLE KNOCKING HAMMER
Harry Maxen, 2193 Hubbard, Detroit, Mich.
Filed Jan. 21, 1960, Ser. No. 3,958
5 Claims. (Cl. 17—1)

This invention relates to an improved device for use in the slaughtering of cattle, and more particularly to a novel and improved pneumatically operated hammer for knocking cattle senseless for subsequent slaughtering.

In the past it was customary when slaughtering cattle to first hit them on the head with a hammer so that they could be subsequently slaughtered. In practice this method did not prove satisfactory since the animal usually moved around and was difficult to knock out in an efficient and humane manner. For efficient action the animal should be hit between the eyes with a single hard blow and this is not always possible when a hammer is manually applied. The aforementioned disadvantages involved in the use of a sledge hammer or the like were partially overcome by the use of especially developed guns for killing an animal with a single shot. However, the use of firearms in the slaughtering of animals still has not provided the optimum method for slaughtering. If the animal is killed at the start of the slaughtering operation the blood ceases to flow with a resultant injurious effect on the meat. It is well known that a better grade of meat results from a slaughtering operation which involves only knocking the animal senseless in the first step and not killing it.

In view of the foregoing it is an important object of the present invention to provide a novel and improved pneumatically operated ram for knocking an animal senseless with a single well directed blow whereby an animal may be readied for further slaughtering operations in an efficient and humane manner.

It is another object of the present invention to provide a cattle knocking hammer which is compact and rugged in construction, economical of manufacture, and efficient and easy to operate.

It is a further object of the present invention to provide a cattle knocking hammer of the class described including an air cylinder adapted to power a ram so as to knock an animal senseless with a single blow, and it further includes a mechanical locking means for locking the ram in a cocked position whereby it may be easily released by a trigger means when the trigger means is manually moved into engagement with an animal at a point where it is desired to strike a blow thereon.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a side elevational view of an illustrative embodiment of the invention, showing parts of the structure broken away and with the plate shown in dot dash lines;

FIG. 2 is a horizontal sectional view of the structure illustrated in FIG. 1, taken along the line 2—2 thereof and looking in the direction of the arrows;

FIG. 3 is a fragmentary elevational sectional view of the structure illustrated in FIG. 2, taken along the line 3—3 thereof and looking in the direction of the arrows;

FIG. 4 is a fragmentary elevational view of the structure illustrated in FIG. 2, taken along the line 4—4 thereof and looking in the direction of the arrows;

FIG. 5 is an elevational view of a part of the trigger means employed in the present invention;

FIG. 6 is an elevational sectional view of the structure illustrated in FIG. 5, taken along the line 6—6 thereof and looking in the direction of the arrows;

FIG. 7 is a reduced side elevational view of the embodiment of FIG. 1 and showing the same mounted for suspension from an overhead supporting means;

FIG. 8 is a fragmentary view of the control valve used in the present invention, as viewed in FIG. 1, in the direction of the arrow 8; and, FIG. 9 is a schematic view of the control valve employed in the present invention.

Referring now to the drawings and in particular to FIG. 1, the numeral 10 designates an air cylinder which includes the tubular body 11 which is enclosed on the upper end thereof by the cylinder cap 12 and on the lower end thereof by the cylinder cap 13. The cylinder caps 12 and 13 are secured in sealing engagement with the cylinder body 11 by means of a plurality of circumferentially disposed rods as 14. The lower ends of the rods 14 are threaded into holes as 15 in the lower end cylinder cap 13. The upper ends of the rods 14 extend through the holes 16 in the upper cylinder cap flange 17. Each of the rods 14 is threaded on the upper end thereof and carries a nut as 18 for drawing the rods and cylinder caps securely onto the ends of the cylinder body 11. The upper cylinder cap 12 is provided with the eye bolt 19 for suspending the air cylinder 10 from a suitable supporting means.

Slidably mounted in the cylinder 10 is the piston 20 which is normally biased downwardly to the lower position shown in FIG. 1 by means of the coiled compression spring 21. Fixed to the piston 20 is the piston rod or shaft 22 which is provided with the enlarged head or ram 23 on the outer end thereof. The piston rod 22 is slidably extended outward of the air cylinder through the hole 24 which is formed in the lower end cap 13. A locking means, generally indicated by the numeral 25, is mounted on the lower end of the cylinder end cap 13 by means of the bolts 29. The locking means includes the substantially square plates 26, 27 and 28 which may be respectively named the upper, middle and lower plates. The piston rod 22 extends downwardly through holes 30, 31 and 32 which are formed in the locking means plates 26, 27 and 28, respectively. The locking means 25 will be more fully described in detail hereinafter.

As shown in FIGS. 1 and 7, air under pressure is fed into the upper end of the cylinder 10 by means of the inlet pipe 33 and into the lower end of the cylinder by means of the inlet pipe 36. The inlet pipes 33 and 36 are connected to the flow control valve 35 by means of the pipes 34 and 37, respectively. The air under pressure is fed to the flow control valve 35 by means of the inlet pipe 38 which is adapted to be connected to any suitable source of compressed air. As shown in FIGS. 8 and 9, the valve 35 is provided with the exhaust port 39 for connecting the ends of the cylinder selectively to the atmosphere.

As shown in FIGS. 1 and 7, the air cylinder is provided with a handle which comprises the plate 40 which is fixedly connected to the air cylinder 10 by any suitable means, as by welding. The handle further includes the horizontal arm 41 which is suitably fixedly connected to the plate 40. Fixedly mounted on the outer end of the handle arm 41 is the pivot post 42 on the upper end of which is pivoted the control pedal 43. The control pedal 43 is adapted to selectively engage the limit valves 44 and 45 which are connected by means of the flexible tubes 46 and 47 to the valve 35. As shown in FIG. 9, the valve includes a sliding spool 48 which is adapted to be moved to one end or the other of the valve 35 so as to selectively admit air to the upper and lower ends of the cylinder 12. A valve of this type is available on the market and is sold by the Mead Specialties Co. of Chicago, Illinois, under Model No. 802A. Suitable limit valves for performing the function of valves 44 and 45 are also sold by the aforementioned company under Model No. 403. The aforementioned valve is merely an illustrative type which may be employed to control the flow of air to either end of the cylinder 12. In brief, the operation of the valve 35 is as follows. Air under pressure is admitted at all times through the pipe 38 into the upper end of the valve, and when the spring biased ball of the limit valve 44 is pressed inwardly by the pedal 44, air is permitted to escape through the tube 46 to the atmosphere whereby pressure on the other end of the shuttle valve will cause it to be shifted to the right or to the position shown in FIG. 9. It will thus be seen that the pipe 34 leading to the upper end of the cylinder will be connected to the exhaust port 39 while the pressurized upper end of the cylinder 35 will be connected to the line 37 to admit air under pressure to the lower end of the cylinder 12. When the limit valve 45 is operated by pressure from the pedal 43 the shuttle valve or spool 48 will be moved to the left as viewed in FIG. 9 to direct pressure to the upper end of the cylinder through the line 34 and to exhaust the lower end of the cylinder.

As shown in FIGS. 2, 3 and 4, the plate 27 is provided with a hollow chamber on the upper side thereof which is indicated by the numeral 49 and which is enclosed by the bottom wall 50. Swingably mounted in the compartment 49 is the pair of locking plates 51 and 52. The plates 51 and 52 are swingably mounted on the pins 53 and 54, respectively, and these pins are fixed in the bottom wall 50 on one end thereof and in the plate 26 on the other end thereof. As shown in FIG. 2, the locking plates 51 and 52 are provided with the outwardly extended arms 55 and 56, respectively, which extend outwardly of the plate 27 through the slot 57. The locking plate arms 55 and 56 extend into the tapered recess 58 which is formed on the inner side of the wedge plate 59. It will be seen that when the wedge plate 59 is moved downwardly, the upwardly and inwardly tapered sides of the recess 58 will cam the lock plates 51 and 52 inwardly to the solid line position shown in FIG. 2. When the wedge plate 59 is moved upwardly, as more fully described hereinafter, the locking plates will be permitted to be moved outwardly about their pivot pins to the dotted line position shown in FIG. 2.

The wedge plate 59 is fixedly mounted by means of the bracket 60 to the trigger rod 61. As shown in FIG. 3, the lock plates 51 and 52 are provided with the arcuate recesses 62 and 63 along the inner sides thereof for engagement with the reduced or neck portion 64 on the lower end of the piston rod 22. The upper portion of the neck 64 is tapered downwardly and inwardly as indicated by the numeral 65, and this tapered portion functions as a cam in conjunction with the tapered upper edges 66 on the arcuate locking plates recesses 62 and 63. It will be seen that when the locking plates 51 and 52 are secured in the recess 64 in the rod 22, that the piston rod 22 will be held in an upwardly moved locked position.

As shown in FIG. 1, the trigger rod 61 is slidably mounted in the bushing 67 which is fixed in the sleeve 68. The upper end of the sleeve 68 is fixedly secured in the bracket 69 which is in turn fixed to the upper end of the cylinder 10.

The lower end 70 of the trigger rod 61 is curved inwardly toward the piston rod 22 and the extreme lower end thereof is bent downwardly as shown by the numeral 71 to form a vertical trigger for engagement with the animal to be slaughtered. As shown in FIG. 7, the hammer of the present invention may be suspended from an overhead supporting means or a ceiling by means of the cable 72 which may be operatively mounted on the conventional spring return reel 73.

In the use of the device of the present invention the valve 35 is first operated so as to exhaust the top end of the cylinder 10 and admit air under pressure into the lower end thereof so as to force the piston 20 upwardly from the rest position shown in FIG. 1 until the locking plates 51 and 52 engage in the recess 64 on the piston rod 22. The tapered sides of the recess 58 exert an inward force on the outer sides of the locking plates 51 and 52 so that these plates will automatically move into a locking position in the piston rod groove 64. The wedge plate 59 exerts this pressure on the locking means by means of gravity. It will be seen that when the piston and piston rod 23 are held in the cocked position indicated by the dotted ram numeral 74 in FIG. 1, the wedge plate 59 will be in the down position indicated by the numeral 75. The trigger end 71 of the rod 61 will be in the lower dotted position 76 under these conditions. When the animal to be slaughtered is admitted to the knocking pen, the operator maneuvers the cylinder over the head of the animal and drops it downwardly so as to hit the animal's head with the trigger 71. The trigger 71 and the rod 61 will be moved upwardly by the aforementioned hitting action and the wedge plate 59 will be moved upwardly to the solid line position shown in FIG. 1. The operator will previously have exhausted the lower end of the cylinder and have admitted air pressure into the upper end of the cylinder whereby when the wedge plate 59 is moved upwardly, the compression of the spring 21 and the air pressure in the upper end of the cylinder will force the piston downwardly instantly. The locking plate arms 55 and 56 are free to move outwardly under these conditions since the wedge plate has moved upwardly whereby a wider part of the recess 58 is disposed opposite the slot 57 through which the locking plate arms extend. The tapered portion 65 on piston rod 22 functions as a cam operating on the mating tapered surfaces 66 on the locking plates so as to force these plates outwardly to the dotted line position shown in FIG. 2 and to permit the piston rod 22 to be moved instantly downwardly to bring the ram 23 into striking engagement with the head of the animal. Actual experience has proved that the cattle knocking hammer of the type described is efficient, fast and humane in operation.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A device of the class described, comprising: an air cylinder; a piston movably mounted in said cylinder and movable between a rest position and a cocked position; a piston rod having one end fixed to said piston and the other end thereof extended outwardly through the lower end of said cylinder when the piston is in the rest and cocked positions; means for alternately admitting and exhausting air under pressure to and from each end of said cylinder for moving said piston upwardly and downwardly; a ram on said other end of said piston rod for striking an animal on the head for stunning the same; a locking means on the lower end of said cylinder including inter-engageable means between said cylinder and said piston rod for locking engagement with said piston rod in an upper position to hold said ram in cocked condition ready for striking an animal; and, a trigger means carried on said cylinder for disabling said locking means for releasing said rod and ram for an operative stroke against the head of an animal when said trigger means is brought into contact with the head of the animal.

2. A device of the class described, comprising: an air cylinder; a piston movably mounted in said cylinder and movable between a rest position and a cocked position; a piston rod having one end fixed to said piston and the other end thereof extended outwardly through the lower end of said cylinder when the piston is in the rest and cocked positions; means for alternately admitting and exhausting air under pressure to and from each end of said cylinder for moving said piston upwardly and downwardly; a ram on said other end of said piston rod for striking an animal on the head for stunning the same; a locking means on the lower end of said cylinder including inter-engageable means between said cylinder and said piston rod for locking engagement with said piston rod in an upper position to hold said ram in cocked condition ready for striking an animal and with air under pressure in the top of the cylinder and the bottom end of the cylinder open to the atmosphere; a spring means in the upper end of the cylinder for normally biasing said piston downwardly; and, a trigger means carried on said cylinder for disabling said locking means for releasing said rod and ram for an operative stroke against the head of an animal when said trigger means is brought into contact with the head of the animal.

3. A device of the class described, comprising: an air cylinder; a piston movably mounted in said cylinder and movable between a rest position and a cocked position; a piston rod having one end fixed to said piston and the other end thereof extended outwardly through the lower end of said cylinder when the piston is in the rest and cocked positions; means for alternately admitting and exhausting air under pressure to and from each end of said cylinder for moving said piston upwardly and downwardly; a ram on said other end of said piston rod for striking an animal on the head for stunning the same; a spring means in the upper end of said cylinder for normally biasing said piston downwardly; a gravity operated locking means mounted on the lower end of said cylinder including inter-engageable means between said cylinder and said piston rod for locking engagement with said piston rod when it is in an upwardly disposed position and against the pressure of said spring means and air under pressure in the upper end of the cylinder to hold said ram in cocked position ready for striking an animal and with the bottom of the cylinder open to the atmosphere by means of said means for exhausting the same; and, a trigger means slidably mounted on said cylinder and connected to said locking means for disabling said locking means for releasing said rod and ram for an operative stroke against the head of an animal when said trigger means is brought downwardly into contact with the head of the animal.

4. A device of the class described, comprising: an air cylinder; a piston movably mounted in said cylinder; a piston rod having one end fixed to said piston and the other end thereof extended outwardly through the lower end of said cylinder; means for alternately admitting and exhausting air under pressure to and from each end of said cylinder for moving said piston upwardly and downwardly; a ram on said other end of said piston rod for striking an animal on the head for stunning the same; a spring means in the upper end of said cylinder for normally biasing said piston downwardly; a gravity operated locking means mounted on the lower end of said cylinder for locking engagement with said piston rod when it is in an upwardly disposed position and against the pressure of said spring means and air under pressure in the upper end of the cylinder to hold said ram in cocked position ready for striking an animal and with the bottom of the cylinder open to the atmosphere by means of said means for exhausting the same; a trigger means slidably mounted on said cylinder and connected to said locking means for disabling said locking means for releasing said rod and ram for an operative stroke against the head of an animal when said trigger means is brought downwardly into contact with the head of an animal; said locking means comprising a pair of horizontally disposed swingably mounted locking plates, a wedge plate having an upwardly and inwardly tapered recess on one side thereof, said locking plates each having an arm extended into the tapered recess in said wedge plate, and said wedge plate being fixedly mounted on said trigger means, whereby when the piston rod is in the upper position, the wedge plate will move to a downwardly position by means of gravity so as to cam the locking plates inwardly into a locking engagement with the piston rod by means of the locking plate arms riding against the tapered recess sides in the wedge plate.

5. A device of the class described, comprising: an air cylinder; a piston movably mounted in said cylinder and movable between a rest position and a cocked position; a piston rod having one end fixed to said piston and the other end thereof extended outwardly through the lower end of said cylinder when the piston is in the rest and cocked positions; means for alternately admitting and exhausting air under pressure to and from each end of said cylinder for moving said piston upwardly and downwardly; a ram on said other end of said piston rod for striking an animal on the head for stunning the same; a locking means on the lower end of said cylinder including inter-engagable means between said cylinder and said piston rod for locking engagement with said piston rod in an upper position to hold said ram in cocked condition ready for striking an animal; a trigger means carried on said cylinder for disabling said locking means for releasing said rod and ram for an operative stroke against the head of an animal when said trigger means is brought into contact with the head of an animal; said locking means comprising a pair of horizontally disposed swingably mounted locking plates, a wedge plate having an upwardly and inwardly tapered recess on one side thereof, said locking plates each having an arm extended into the tapered recess in said wedge plate, and said wedge plate being fixedly mounted on said trigger means, whereby when the piston rod is in the upper position, the wedge plate will move to a downwardly position by means of gravity so as to cam the locking plates inwardly into a locking engagement with the piston rod by means of the locking plate arms riding against the tapered recess sides in the wedge plate.

References Cited in the file of this patent

UNITED STATES PATENTS

| | | |
|---|---|---|
| 1,099,935 | Ransom | June 16, 1914 |
| 1,655,671 | Watkins | Jan. 10, 1928 |
| 2,536,336 | Watson | Jan. 2, 1951 |